United States Patent [19]

Springer

[11]  4,350,632
[45]  Sep. 21, 1982

[54] WATER-SOLUBLE PHTHALOCYANINE COMPOUNDS

[75] Inventor: Hartmut Springer, Königstein, Fed. Rep. of Germany

[73] Assignee: Hoechst Aktiengesellschaft, Frankfurt am Main, Fed. Rep. of Germany

[21] Appl. No.: 280,814

[22] Filed: Jul. 6, 1981

[30] Foreign Application Priority Data

Jul. 8, 1980 [DE] Fed. Rep. of Germany ....... 3025790

[51] Int. Cl.³ .................... C09B 47/04; C09B 47/28
[52] U.S. Cl. .................... 260/314.5; 8/661
[58] Field of Search .................... 260/314.5

[56] References Cited

U.S. PATENT DOCUMENTS 4,036,585  7/1977  James et al. ............... 260/314.5 X
4,135,944  1/1979  Wheeler ................... 260/314.5 X

*Primary Examiner*—Richard Raymond
*Attorney, Agent, or Firm*—Curtis, Morris & Safford

[57] ABSTRACT

Phthalocyanine compounds of the general formula

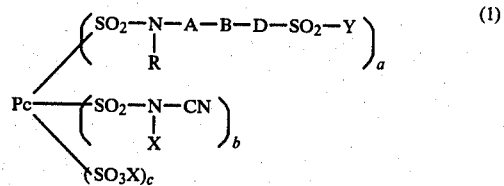

in which Pc is the radical of copper, cobalt or nickel phthalocyanine which can be substituted by chlorine or phenyl, a denotes a whole or fractional number from 1 to 3, b denotes a whole or fractional number from 1 to 3 and c denotes a whole or fractional number from zero to 2, it being possible for a, b and c to be identical or different from one another, but the total of (a+b+c) is equal to a whole or fractional number from 2 to 4, R represents a hydrogen atom or an alkyl group having 1 to 4 C atoms, A is a direct bond or a group of the general formula —$(CH_2)_m$— or —$(CH_2)_n$—NH— in which m denotes a whole number from 1 to 4 and n denotes a whole number from 2 to 6, B is the phenylene or naphthylene radical which can be substituted by alkyl having 1 to 4 C atoms, alkoxy having 1 to 4 C atoms, halogen, carboxy, sulfo, carbamoyl, sulfamoyl, alkylsulfonyl having 1 to 4 C atoms, carboalkoxy having 2 to 5 C atoms, acetylamino and nitro, D represents a direct bond or a radical of the formula —$CH_2$— or —$CH_2$—$CH_2$—, Y represents the vinyl group or the β-sulfatoethyl, β-phosphatoethyl, β-thiosulfatoethyl, β-hydroxyethyl or β-chloroethyl group and X is a hydrogen atom or the equivalent of a monovalent, bivalent or trivalent metal.

8 Claims, No Drawings

WATER-SOLUBLE PHTHALOCYANINE COMPOUNDS

German Patent Specification No. 1,179,317 discloses fiber-reactive phthalocyanine dyes which contain sulfo groups and contain one to three aromatic radicals which have a β-sulfatoethylsulfonyl or vinylsulfonyl group and are linked to the phthalocyanine nucleus via sulfonamide groups. Furthermore, German Patent Specification No. 1,283,997 discloses fiber-reactive phthalocyanine dyes which, if appropriate, contain sulfo groups and in which, in comparison with the phthalocyanine dyes of German Patent Specification No. 1,179,317 mentioned above, the sulfo groups located on the phthalocyanine nucleus are completely or partially replaced by sulfonamide groups which are linked to the phthalocyanine nucleus and are optionally substituted by alkyl and/or aryl groups. Compared with the phthalocyanine dyes first mentioned, the phthalocyanine dyes of German Patent Specification No. 1,283,997 have, in part, improved tinctorial properties, but in general also have a lower solubility, since the total number of substituents which can be introduced in a simple manner into the phthalocyanine molecule by the route of sulfonation or sulfochlorination, is not greater than 4.

By means of the present invention new phthalocyanine compounds have now been found which, in addition to very good tinctorial properties, also have optimum solubility. The good solubility of these new compounds is based on the sulfonylcyanamide group which is contained in them once or several times. This group can be regarded, on the one hand, as a substituted sulfonamide group; on the other hand it has a strongly acid hydrogen atom and therefore, as an anionic grouping, has a good action in imparting solubility. The water-solubility of the new phthalocyanine compounds according to the invention is thus not linked to the presence of sulfo groups.

In the acid form and in the form of their salts, the new phthalocyanine compounds have the general formula

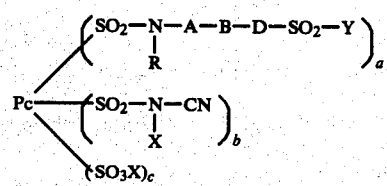

(1)

in which the symbols have the following meanings: Pc is the radical of copper, cobalt or nickel phthalocyanine in which the phthalocyanine can additionally be substituted by chlorine or phenyl in the 3-position and/or 4-position of the carbocyclic aromatic rings of the phthalocyanine and in which the sulfonylcyanamide, sulfonamide and/or sulfonic acid groups are linked in the 3-position and/or 4-position of the carbocyclic aromatic rings of the phthalocyanine; a is a whole or fractional number from 1 to 3; b is a whole or fractional number from 1 to 3; c is a whole or fractional number from zero to 2, it being possible for a, b and c to be identical or different from one another, but the total (a+b+c) is equal to a whole or fractional number from 2 to 4; R is a hydrogen atom or an alkyl group having 1 to 4 C atoms; A is a direct bond or a group of the general formulae —(CH$_2$)$_m$— or —(CH$_2$)$_n$—NH— in which m is a whole number from 1 to 4 and n is a whole number from 2 to 6; B is the phenylene or naphthylene radical which can be substituted by substituents, preferably 1 to 3 substituents, belonging to the group comprising alkyl having 1 to 4 C atoms, such as methyl and ethyl, alkoxy having 1 to 4 C atoms, such as methoxy and ethoxy, halogen, such as chlorine and bromine, carboxy, sulfo, carbamoyl, sulfamoyl, alkylsulfonyl having 1 to 4 C atoms, carboalkoxy having 2 to 5 C atoms, acetylamino and nitro; D is a direct bond or a radical of the formulae —CH$_2$— or —CH$_2$—CH$_2$—; Y is the vinyl group or the β-sulfatoethyl, β-phosphatoethyl, β-thiosulfatoethyl, β-hydroxyethyl or β-chloroethyl group; and X is hydrogen or the equivalent of a monovalent, bivalent or trivalent metal, preferably sodium or potassium.

If X represents a hydrogen atom, the new compounds of the formula (1) are acid compounds even in the event that c=zero, since the amino radical in the sulfonylcyanamide grouping is so strongly polarized that the hydrogen atom of the amino group reacts as a proton and is readily replaceable by other salt-forming cations, such as sodium and potassium ions.

Only in exceptional cases the phthalocyanine compounds according to the invention are single-substance compounds according to the general formula (1) in which the indices a, b and c are whole numbers. In most cases they are mixtures of individual compounds of formula (1), the indices a, b and c representing thus average values and thus being often fractional numbers. The individual constituents of the mixture are, however, always compounds having integral indices.

Preferred phthalocyanine compounds according to the invention and corresponding to the general formula (1) are those of the general formula (2)

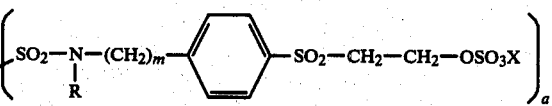
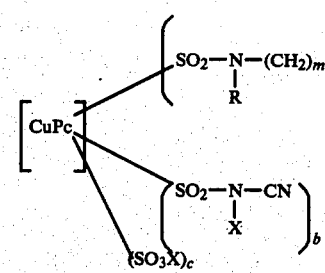
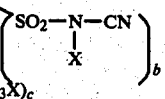

(2)

in which CuPc denotes the radical of copper phthalocyanine in which the sulfonylcyanide, sulfonamide and/or sulfonic acid groups are attached to the 3-position and/or 4-position of the carbocyclic aromatic rings of the phthalocyanine, R, X and m have one of the abovementioned meanings and a, b and c, having a total of 2 to 4, represent one of the groupings (2a) to (2e):

(2a): a=1, b=3, c=0;
(2b): a=2, b=2, c=0;
(2c): a=1, b=2, c=1;
(2d): a=2, b=1, c=1;
(2e): a=3, b=1, c=0.

The present invention also relates to processes for the manufacture of the new compounds corresponding to the general formula (1). Their manufacture can be effected analogously to known procedures for the synthesis of phthalocyanine compounds containing sulfonamide groups and optionally containing sulfo groups, by reacting phthalocyanine sulfochlorides which optionally contain sulfo groups, with appropriate amino derivatives, such as analogously to procedures which are described, for example, in German Patent Specification Nos. 1,179,317 and 1,283,997, which are mentioned above. The process according to the invention for the manufacture of the compounds corresponding to the general formula (1) accordingly comprises reacting a phthalocyaninesulfochloride of the general formula (3)

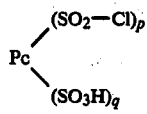

(3)

in which Pc has the abovementioned meaning and p represents a whole or fractional number from 2 to 4 and q represents a whole or fractional number from zero to 2, the total of (p+q) being a whole or fractional number from 2 to 4, simultaneously or in any desired sequence, with an amine of the general formula (4)

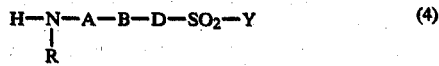

(4)

in which R, A, B, D and Y have the abovementioned meanings, and with cyanamide.

The reaction can be carried out in an aqueous or aqueous organic medium at a pH value from about 4 to about 13 (advantageously at a pH value from 6 to 7 if the amine of the general formula (4) contains the β-sulfatoethyl, β-phosphatoethyl, β-thiosulfatoethyl or β-chloroethyl group, which are represented by the formula Y) in the presence of an acid-binding agent and at a temperature from about 0° C. to about 80° C., preferably at a temperature from 0° to 40° C. In order to accelerate the reaction, it is advantageous to add a tertiary organic base, preferably pyridine or picoline or a pyridine derivative, such as, for example, nicotinic acid. Depending on the quantities of the reactants which are employed and the reaction conditions, the sulfochloride groups present in the phthalocyaninesulfochloride react completely with the amine of the general formula (4) and with the cyanamide, or some of them are saponified to give sulfo groups. This saponification is, if appropriate, either effected under the influence of the aqueous medium in parallel with the condensation reactions which are taking place, or it is carried out subsequently to these reactions, if appropriate by increasing the pH value or the temperature.

The compounds, according to the invention, of the general formula (1) constitute valuable dyes for dyeing materials composed of cellulose, such as natural or regenerated cellulose, or of wool or silk, or materials composed of synthetic polyamide fibers, or materials containing such fibers. The compounds, according to the invention, of the general formula (1) in which the formula radical Y represents the vinyl group of the β-sulfatoethyl, β-phosphatoethyl, β-thiosulfatoethyl or β-chloroethyl group, can, moreover, be used as fiber-reactive dyes for dyeing these materials, in particular cellulose fibers.

Accordingly, the present invention also relates to the use of the compounds, according to the invention, of the general formula (1) as dyes for dyeing (including printing) cellulose-containing materials or wool, silk or synthetic polyamide fiber materials.

Compounds, according to the invention, of the general formula (1) in which the formula radical Y represents the β-hydroxyethyl group, can also be converted, according to the invention, into the corresponding sulfuric acid ester or phosphoric acid ester compounds in which Y is the β-sulfatoethyl or β-phosphatoethyl group, respectively; these esterification reactions are carried out analogously to known esterification procedures using an appropriate sulfating or phosphating agent, such as are known in large numbers in the literature. In these esterification reactions, it is possible for side-reactions to occur in which, depending on the esterification conditions chosen, a small proportion of the sulfonylcyanamide groups can be converted, for example, into sulfonylurea groups or further modified. However, the quality of the phthalocyanine compounds, according to the invention, corresponding to the general formula (1) is not impaired by these side-reactions.

The new compounds according to the invention can be applied to the materials mentioned by customary application processes of dyeing and printing technology and can be fixed on these materials analogously to customary and known procedures, preferably by the action of heat. Dyeings and prints can be produced with the phthalocyanine compounds according to the invention, in particular by using methods of applications and fixation suitable for fiber-reactive dyes which are customary and known in technology, such as are described in large numbers in the literature. In addition to the method of dyeing from a long liquor, preferred processes for application and fixation, particularly for dyeing cellulose-containing fiber materials, are the pad-steam process, the pad-cold batch process and the pad-thermofix process. The particular value of the phthalocyanine compounds, according to the invention, which can be used as dyes lies in the fact that they are fixed by the customary fixing processes in a relatively short time. In addition, they are excellently suitable for dyeing and printing textile materials composed of regenerated cellulose fibers. Valuable turquoise-blue dyeings and prints which are distinguished by very good fastness properties, above all very good fastness to light and wet processing, such as, for example, fastness to washing, perspiration, acids and alkalis, are obtained by these dyeing methods, using the new phthalocyanine compounds.

The examples which follow serve to illustrate the invention. Unless a note is made to the contrary, the parts are parts by weight and the percentages refer to percentages by weight. The relationship between parts by weight and parts by volume is that of kilogram to liter. The formula radicals CuPc, NiPc and CoPc denote the unsubstituted copper, nickel and cobalt phthalocyanine skeleton, respectively.

EXAMPLE 1

53.1 parts of the hydrochloride of 4-(β'-hydroxyethylsulfonyl)-1-(β-aminoethyl)-benzene and 8.4 parts of cyanamide are dissolved in 200 parts of water. This solution is cooled to 0° C. and 97 parts of copper phthalocyanine-(3)-tetrasulfochloride are introduced in the form of a moist filter cake, while stirring. The reaction mixture is adjusted to a pH of 12 by adding aqueous 16.5% strength sodium hydroxide solution and stirred at 0° to 5° C., the pH of 12 being maintained by dropwise addition of further sodium hydroxide solution. The reaction is complete as soon as no further sodium hydroxide solution is consumed. Altogether, about 230 parts of 16.5% strength sodium hydroxide solution must be used.

The resulting suspension is then neutralized by adding 78 parts by volume of aqueous 2 N hydrochloric acid, and the compound which has been precipitated is filtered off and dried. This gives about 144 parts of a salt-containing product which has the following composition, written in the form of the free acid:

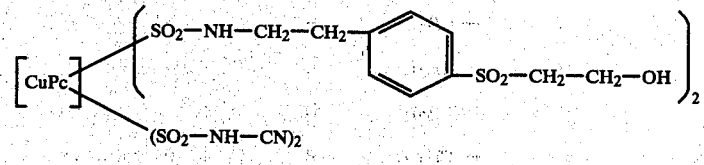

This product is converted into the β-sulfatoethylsulfonyl compound by being introduced into 330 parts of 100% strength sulfuric acid, while stirring; in the course of this the temperature should not rise higher than 50° to 55° C., in order to avoid side reactions. Stirring is then continued for a further hour at 50° to 55° C. The clear solution which has then been formed is introduced immediately, while stirring, into about 3,000 parts of ice. The compound which has been precipitated is filtered off and the filter cake is suspended in about 3,000 parts of water; the pH of the suspension is then adjusted to a value of 5 by adding about 80 parts of sodium bicarbonate slowly. A deep blue solution is formed, which is evaporated. This gives about 200 parts of a dark blue product which contains electrolyte and the sodium salts of phthalocyanine compounds corresponding to the composition represented by the formula:

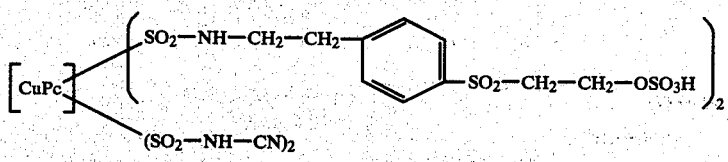

This product dissolves in water to give a blue color and, when applied by the methods of application and fixing which are customary and known for fiber-reactive dyes, and which are employed, in particular, for rapid-fixing reactive dyes, produces turquoise-blue dyeings and prints which have excellent fastness properties, in particular very good fastness to light and wet processing, such as, for example, fastness to washing, perspiration, acid and alkali.

EXAMPLES 2 to 33

The tabular Examples which follow describe further phthalocyanine compounds, according to the invention, which correspond to the general formula (1) and which are prepared in a manner according to the invention by reacting a phthalocyaninesulfochloride with the amine indicated, corresponding to the general formula (4), and cyanamide. The phthalocyanine compounds, according to the invention, which can be obtained thereby by varying the quantities of amine and cyanamide employed, are characterized in the tabular examples by means of the formula units of the general formula (5) below:

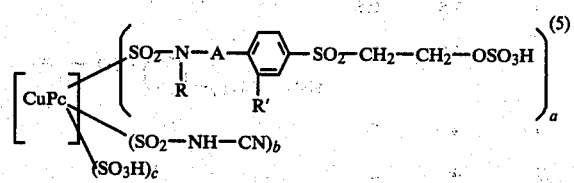

These compounds of Examples 2 to 33 can be prepared, for example, analogously to the procedure described in the above Example 1 by suitable variation of the starting compounds, such as in respect of the degree of sulfonation of the copper phthalocyaninesulfochloride used, of the nature and quantity of the amine (4) employed or of the quantity of cyanamide employed, as indicated in the Examples.

These phthalocyanine compounds, according to the invention, which are described in the tabular Examples are also very readily soluble in water and exhibit excellent properties as dyes. They make it possible, in particular, to produce, using the methods of application and fixing which are customary for fiber-reactive dyes, dyeings and prints on cotton and staple rayon which exhibit the good fastness properties mentioned in Example 1.

| Example | Pc-sulfochloride[3] p | q | Amine[4] | Compounds corresponding to formula[5] R | A | R' | a | b | c | Color shade of the dyeing |
|---|---|---|---|---|---|---|---|---|---|---|
| 2 | 4 | 0 | H₂N—CH₂—⟨phenyl⟩—SO₂—CH₂—CH₂—OH | H | —CH₂— | H | 2 | 2 | 0 | turquoise-blue |
| 3 | 4 | 0 | " | H | —CH₂— | H | 3 | 1 | 0 | turquoise-blue |
| 4 | 4 | 0 | " | H | —CH₂— | H | 1 | 3 | 0 | turquoise-blue |
| 5 | 3 | 0 | " | H | —CH₂— | H | 2 | 1 | 0 | turquoise-blue |
| 6 | 3 | 0 | " | H | —CH₂— | H | 1 | 2 | 0 | turquoise-blue |
| 7 | 3.5 | 1.5 | " | H | —CH₂— | H | 1 | 2 | 1 | turquoise-blue |
| 8 | 4 | 0 | " | H | —CH₂— | H | 2 | 1 | 1 | turquoise-blue |
| 9 | 2.5 | 0.5 | " | H | —CH₂— | H | 1 | 1 | 1 | turquoise-blue |
| 10 | 3.7 | 0.3 | H₂N—(CH₂)₂—⟨phenyl⟩—SO₂—CH₂—CH₂—OH | H | —(CH₂)₂— | H | 2 | 1 | 1 | turquoise-blue |
| 11 | 4 | 0 | " | H | —(CH₂)₂— | H | 1 | 3 | 0 | turquoise-blue |
| 12 | 4 | 0 | " | H | —(CH₂)₂— | H | 1 | 2 | 1 | turquoise-blue |
| 13 | 4 | 0 | " | H | —(CH₂)₂— | H | 3 | 1 | 0 | turquoise-blue |
| 14 | 4 | 0 | " | H | —(CH₂)₂— | H | 1.5 | 1.5 | 1 | turquoise-blue |
| 15 | 4 | 0 | " | H | —(CH₂)₂— | H | 1 | 1 | 2 | turquoise-blue |
| 16 | 3 | 0 | " | H | —(CH₂)₂— | H | 2 | 1 | 0 | turquoise-blue |
| 17 | 3 | 0 | " | H | —(CH₂)₂— | H | 1 | 2 | 0 | turquoise-blue |
| 18 | 2 | 0 | " | H | —(CH₂)₂— | H | 1 | 1 | 0 | turquoise-blue |
| 19 | 4 | 0 | H₂N—(CH₂)₄—⟨phenyl⟩—SO₂—CH₂—CH₂—OH | H | —(CH₂)₄— | H | 2 | 2 | 0 | turquoise-blue |
| 20 | 4 | 0 | " | H | —(CH₂)₄— | H | 2 | 1 | 1 | turquoise-blue |
| 21 | 3 | 0 | " | H | —(CH₂)₄— | H | 2 | 1 | 0 | turquoise-blue |
| 22 | 4 | 0 | HN(CH₃)—CH₂—⟨phenyl⟩—SO₂—CH₂—CH₂—OH | —CH₃ | —CH₂— | H | 2 | 2 | 0 | turquoise-blue |
| 23 | 4 | 0 | " | —CH₃ | —CH₂— | H | 2 | 1 | 1 | turquoise-blue |
| 24 | 3 | 0 | " | —CH₃ | —CH₂— | H | 2 | 1 | 0 | turquoise-blue |
| 25 | 4 | 0 | HN(CH₃)—(CH₂)₂—⟨phenyl⟩—SO₂—CH₂—CH₂—OH | —CH₃ | —(CH₂)₂— | H | 2 | 2 | 0 | turquoise-blue |
| 26 | 4 | 0 | " | —CH₃ | —(CH₂)₂— | H | 2 | 1 | 1 | turquoise-blue |
| 27 | 3 | 0 | " | —CH₃ | —(CH₂)₂— | H | 2 | 1 | 0 | turquoise-blue |
| 28 | 4 | 0 | HN(C₂H₅)—(CH₂)₂—⟨phenyl⟩—SO₂—CH₂—CH₂—OH | —C₂H₅ | —(CH₂)₂— | H | 2 | 2 | 0 | turquoise-blue |
| 29 | 4 | 0 | " | —C₂H₅ | —(CH₂)₂— | H | 2 | 1 | 1 | turquoise-blue |
| 30 | 3 | 0 | " | —C₂H₅ | —(CH₂)₂— | H | 2 | 1 | 0 | turquoise-blue |
| 31 | 4 | 0 | H₂N—(CH₂)₂—NH—⟨phenyl-NO₂⟩—SO₂—CH₂—CH₂—OH | H | —(CH₂)₂—NH— | —NO₂ | 2 | 2 | 0 | green |
| 32 | 4 | 0 | " | H | " | —NO₂ | 2 | 1 | 1 | green |

-continued

| Example | Pc-sulfochloride[3] | | Amine[4] | Compounds corresponding to formula[5] | | | | | Color shade of the dyeing |
|---|---|---|---|---|---|---|---|---|---|
| | p | q | | R | A | R' | a | b | c | |
| 33 | 3 | 0 | " | H | " | $-NO_2$ | 2 | 1 | 0 | green |

EXAMPLE 34

61.8 parts of 4-($\beta'$-sulfatoethylsulfonyl)-1-($\beta$-aminoethyl)-benzene, which has been obtained by reacting the hydrochloride of 4-($\beta$-hydroxyethylsulfonyl)-1-($\beta$-aminoethyl)-benzene (see Example 1) with concentrated sulfuric acid, are stirred in 500 parts of water together with 8.4 parts of cyanamide and 12.3 parts of pyridine-3-carboxylic acid. 97 parts of copper phthalocyanine-(3)-tetrasulfochloride are introduced into the resulting suspension in the form of a moist filter cake, while stirring. The pH of the reaction mixture is then adjusted to a value of 6.5 by adding sodium bicarbonate and the mixture is warmed to 50° C. In the condensation reaction which now starts, the pH is kept at a value of 6.5 by means of sodium bicarbonate. After a reaction time of about 5 hours, the pH value remains constant of its own accord and the reaction is complete. About 74 parts of sodium bicarbonate are consumed. The resulting deep blue solution is cooled to 20° C. and the compound according to the invention which has been formed is isolated by salting out. Filtration and drying give a product containing, besides electrolyte, the sodium salts of the compound, according to the invention, corresponding to the composition expressed in the formula:

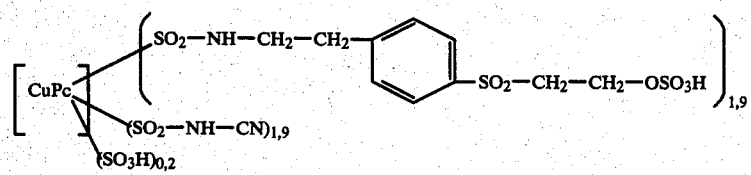

These salts dissolve in water to give a blue color and exhibit very good properties as dyes. When using processes for application and fixing which are customary in technology for fiber-reactive dyes, in particular processes for rapid-fixing reactive dyes, they produce, on cotton and staple rayon, turquoise-blue dyeings and prints which have the excellent fastness properties indicated in Example 1.

EXAMPLES 35 to 45

The tabular examples which follow describe further phthalocyanine compounds, according to the invention, which correspond to the general formula (1) and which are prepared, according to the invention, by reacting a phthalocyaninesulfochloride with the amine indicated, corresponding to the general formula (4), and cyanamide. The phthalocyanine compounds, according to the invention, which are obtained thereby by varying the quantities of amine and cyanamide employed are characterized in the tabular examples by means of the formula units of the general formula (6) below:

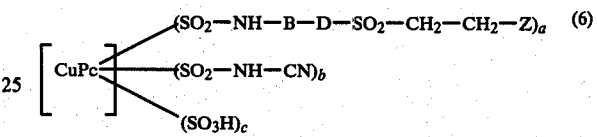

These compounds of Examples 35 to 45 can be prepared, for example, analogously to the procedure described in the above Example 34 by suitable variation of the starting compounds, of the degree of sulfonation in the copper phthalocyaninesulfochloride used and also the nature and quantity of the amine (4) employed and the quantity of cyanamide employed, as indicated in the Examples.

These phthalocyanine compounds, according to the invention, which are described in the tabular examples are also very readily soluble in water and exhibit outstanding properties as dyes. They make it possible, in particular, to produce, using the methods of application and fixing which are customary for fiber-reactive dyes, dyeings and prints on cotton and staple rayon which exhibit the good fastness properties mentioned in Example 1.

| Example | Pc-sulfochloride (3) | | Amine (4) | Compounds corresponding to formula (6) | | | | | | Color shade of the dyeing |
|---|---|---|---|---|---|---|---|---|---|---|
| | p | q | | B | D | Z | a | b | c | |
| 35 | 4 | 0 | H₂N–⌬–SO₂–CH₂–CH₂–OSO₃H | –⌬– | direct bond | $-OSO_3H$ | 1.5 | 1.5 | 1 | turquoise-blue |
| 36 | 4 | 0 | H₂N–⌬–SO₂–CH₂–CH₂–OSO₃H | –⌬– | " | $-OSO_3H$ | 1.5 | 1.5 | 1 | " |
| 37 | 4 | 0 | " | " | " | $-OSO_3H$ | 2 | 2 | 0 | " |
| 38 | 4 | 0 | " | " | " | $-OSO_3H$ | 1 | 3 | 0 | " |

-continued

| Example | Pc-sulfochloride (3) p | q | Amine (4) | Compounds corresponding to formula (6) B | D | Z | a | b | c | Color shade of the dyeing |
|---|---|---|---|---|---|---|---|---|---|---|
| 39 | 4 | 0 | H₂N—⌬(CH₃O)—SO₂—CH₂—CH₂—OSO₃H | CH₃O—⌬— | " | —OSO₃H | 1.5 | 1.5 | 1 | " |
| 40 | 4 | 0 | H₂N—⌬(CH₃)—SO₂—CH₂—CH₂—OSO₃H | CH₃—⌬— | " | —OSO₃H | 1.5 | 1.5 | 1 | " |
| 41 | 4 | 0 | H₂N—naphthyl—SO₂—CH₂—CH₂—OSO₃H | naphthyl— | " | —OSO₃H | 1.5 | 1.5 | 1 | " |
| 42 | 3 | 0 | H₂N—⌬—SO₂—CH₂—CH₂—OSO₃H | ⌬— | " | —OPO₃H₂ | 1 | 2 | 0 | " |
| 43 | 4 | 0 | H₂N—⌬—SO₂—CH₂—CH₂—OSO₃H | ⌬— | " | —S—SO₃H | 1 | 2 | 1 | " |
| 44 | 4 | 0 | H₂N—⌬—CH₂—SO₂—CH₂—CH₂—OSO₃H | ⌬— | —CH₂— | —OSO₃H | 2 | 2 | 0 | " |
| 45 | 4 | 0 | H₂N—⌬—(CH₂)₂—SO₂—CH₂—CH₂—OSO₃H | ⌬— | —(CH₂)₂— | —OSO₃H | 2 | 2 | 0 | " |

EXAMPLE 46

43.9 parts of 4-(β-chloroethylsulfonyl)-aniline, 8.4 parts of cyanamide and 67 parts of sodium bicarbonate are introduced into 500 parts by volume of N-methyl-pyrrolidone and the mixture is stirred. This mixture is then cooled to 0° to 5° C. and 97.4 parts of copper phthalocyanine-(3)-tetrasulfochloride are introduced slowly in the form of a moist filter cake, while maintaining this temperature. The reaction mixture is then stirred for a further 8 hours at 0° to 5° C. and then for a further 16 hours at 20° to 25° C. The reaction mixture is then diluted with water and the compound which has been synthesized is precipitated by adding hydrochloric acid and is filtered off. The moist filter cake is made into a paste with water and neutralized with sodium bicarbonate and the mixture is then evaporated to dryness. The powder obtained which dissolves very readily in water to give a turquoise-blue color, contains besides electrolyte, the sodium salt of the compound corresponding to the following formula:

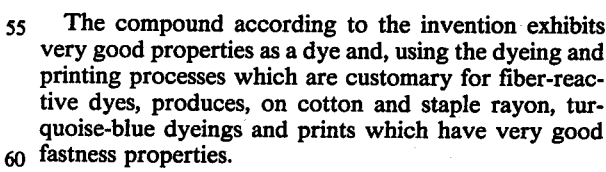

The compound according to the invention exhibits very good properties as a dye and, using the dyeing and printing processes which are customary for fiber-reactive dyes, produces, on cotton and staple rayon, turquoise-blue dyeings and prints which have very good fastness properties.

EXAMPLE 47

The procedure indicated in Example 46 is followed, but 36.6 parts of 4-vinylsulfonylaniline are employed instead of 4-(β-chloroethylsulfonyl)-aniline. A product, according to the invention, which corresponds to the formula

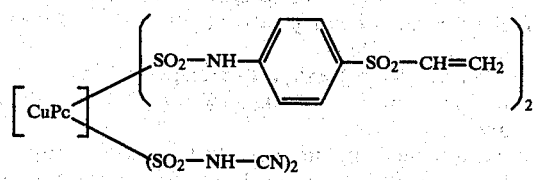

is obtained in the form of the sodium salt. This compound also exhibits outstanding properties as a dye and, using the methods of application and fixing which are customary in technology for fiber-reactive dyes, produces deep, turquoise-blue dyeings and prints which have very good fastness properties.

EXAMPLE 48

20 parts of the copper phthalocyanine compound, according to the invention, of Example 1, containing the sulfatoethylsulfonyl group, are dissolved in 200 parts of hot water together with 50 parts of urea. 400 parts of a thickener composed of 40 parts of sodium alginate and 960 parts of water, and 30 parts of sodium bicarbonate are added, while stirring, to the solution, which has an intense turquoise-blue color. The paste is then made up to 1,000 parts with water and thickener. This printing paste is used to print a cotton fabric, which, after drying, is steamed for 5 minutes at 101° to 103° C. and is rinsed with cold and hot water, soaped at the boil, rinsed again and dried. This gives a deep, turquoise-blue printed pattern which has good fastness to light and has very good resistance to washing treatments.

EXAMPLE 49

Samples of the cotton fabric which have been printed as in Example 48 are steamed at 101° to 103° C. for 10 seconds and for 30 seconds. When the samples of material have been washed, deep, turquoise-blue prints are obtained, which, in respect of depth of color, are comparable with the above printed pattern. The example shows that the dye according to the invention is suitable for the short steaming printing process.

EXAMPLE 50

20 parts of the copper phthalocyanine compound, according to the invention, of Example 1, containing the β-sulfatoethylsulfonyl group, are dissolved in 200 parts of hot water together with 50 parts of urea. 500 parts of a thickener composed of 40 parts of alginate, 10 parts of a polyphosphate, 50 parts of an emulsifier and 900 parts of water are added to this solution, while stirring. The paste is then made up to 1,000 parts with water and thickener.

This printing paste is used to print a cotton fabric which is dried and is then padded with a liquor containing, per liter, 180 g of sodium sulfate, 50 g of potassium carbonate, 150 g of sodium carbonate and 100 ml of 33% strength sodium hydroxide solution. After a skying run of 20 to 40 seconds, the goods are plated or batched up. After a batch time of 20 to 30 minutes at a temperature of 20° C., the goods are rinsed with cold and hot water, soaped, rinsed again and dried. This gives a deep, turquoise-blue printed pattern which has good fastness to light and washing.

The example shows that the dye according to the invention is suitable for the two-phase pad-cold batch process.

EXAMPLE 51

97 parts of copper phthalocyanine-(3)-tetrasulfochloride, in the form of a moist filter cake, are stirred in 200 parts of water. 8.4 parts of a 50% strength aqueous solution of cyanamide are then added, the pH is adjusted to a value of 12 with 2 N sodium hydroxide solution and this pH value is maintained by adding further 2 N sodium hydroxide solution, until a total of 100 parts by volume of this aqueous 2 N sodium hydroxide solution has been consumed. In the course of this, the temperature rises slightly to 23° C. The pH of this batch is then adjusted to a value of 6 with aqueous hydrochloric acid and a neutral solution of 93.3 parts of 3-amino-4-methoxyphenyl β-sulfatoethyl sulfone and 6.2 parts of nicotinic acid in 600 parts of water is added. This reaction mixture is then warmed to 45° C. and the pH is kept at a value of 6 by continuous addition of sodium bicarbonate until this pH value remains constant of its own accord and the condensation reaction is complete. Evaporating the deep blue solution gives about 230 parts of a dark blue product which contains electrolyte and the sodium salts of the phthalocyanine compounds which correspond to a composition, in terms of an average formula, according to the formula:

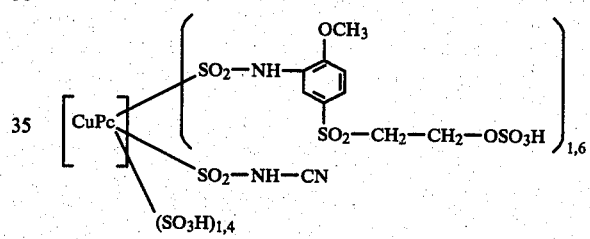

This product dissolves in water to give a blue color and, when used by the methods of application and fixing which are customary and known for fiber-reactive dyes, produces turquoise-blue dyeings and prints which have outstanding fastness properties, in particular very good fastness to light and wet processing, such as, for example, fastness to washing, perspiration, acid and alkali.

EXAMPLE 52

97 parts of copper phthalocyanine-(3)-tetrasulfochloride, in the form of a moist filter cake, are stirred in 200 parts of water. 16.8 parts of a 50% strength aqueous cyanamide solution, the pH of which has been adjusted to a value of 12 with aqueous 2 N sodium hydroxide solution, are added and this pH value is maintained by adding further 2 N sodium hydroxide solution until a total of 200 parts by volume of this aqueous 2 N sodium hydroxide solution has been consumed. In the course of this the temperature rises slightly to 23° C. The pH of this batch is then adjusted to a value of 6 with aqueous hydrochloric acid and a neutral solution of 56.2 parts of 3-aminophenyl-β-sulfatoethylsulfone and 6.2 parts of nicotinic acid in 400 parts of water is added. This reaction mixture is then warmed to 45° C. and the pH is kept at a value of 6 by continuously adding sodium bicarbonate until the pH remains constant of its own accord and the condensation reaction is complete. The deep blue solution is evaporated; it gives about 230 parts of a dark blue product which contains electrolyte and the sodium salts of the phthalocyanine compounds which correspond to the composition, in terms of an average formula, according to the formula:

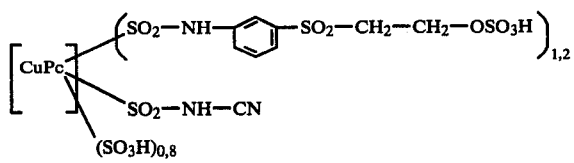

This product dissolves in water to give a blue color and, when used by the methods of application and fixing which are customary and known for fiber-reactive dyes, produces turquoise-blue dyeings and prints which have outstanding fastness properties, in particular very good fastness to light and wet processing, such as, for example, fastness to washing, perspiration, acid and alkali.

I claim:

1. A phthalocyanine compound of formula (1)

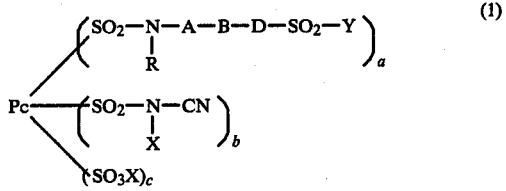

in which
Pc is the radical of the copper, cobalt or nickel phthalocyanine additionally not substituted or substituted by chlorine or phenyl in the 3- and/or 4-positions of the carboxylic aromatic rings of the phthalocyanine, the sulfonylcyanamide, sulfonamide and/or sulfonic acid groups being linked in the 3- and/or 4-positions of the carboxylic aromatic rings of the phthalocyanine,
a is a whole or fractional number from 1 to 3,
b is a whole or fractional number from 1 to 3 and
c is a whole or fractional number from zero to 2,
a, b and c being identical or different from one another, but the total of (a+b+c) is equal to a whole or fractional number from 2 to 4,
R is hydrogen or alkyl of 1 to 4 C atoms,
A is a direct bond or a group of the formula —(CH$_2$)$_m$— or —(CH$_2$)$_n$—NH— in which m is 1, 2, 3 or 4 and n is 2, 3, 4, 5 or 6,
B is phenylene or naphthylene, each unsubstituted or substituted by substituents selected from the group consisting of alkyl of 1 to 4 C atoms, alkoxy of 1 to 4 C atoms, halogen, carboxy, sulfo, carbamoyl, sulfamoyl, alkylsulfonyl of 1 to 4 C atoms, carboalkoxy of 2 to 5 C atoms, acetylamino and nitro,
D is a direct bond or a group of the formula —CH$_2$— or —CH$_2$—CH$_2$—,
Y is vinyl, $\beta$-sulfatoethyl, $\beta$-phosphatoethyl, $\beta$-thiosulfatoethyl, $\beta$-hydroxyethyl or $\beta$-chloroethyl, and
X is hydrogen or the equivalent of a monovalent, bivalent or trivalent metal.

2. A compound according to claim 1 of the formula

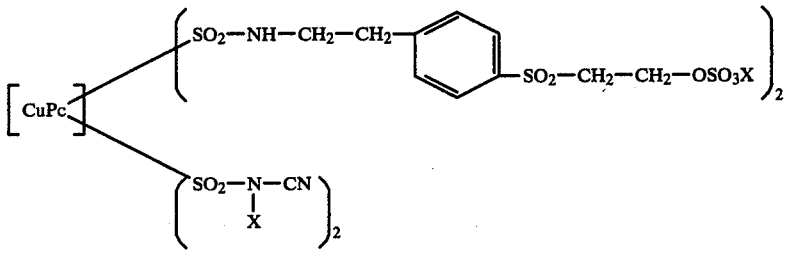

in which CuPc is the radical of copper phthalocyanine and X is defined as in claim 1.

3. A compound according to claim 1 of the formula

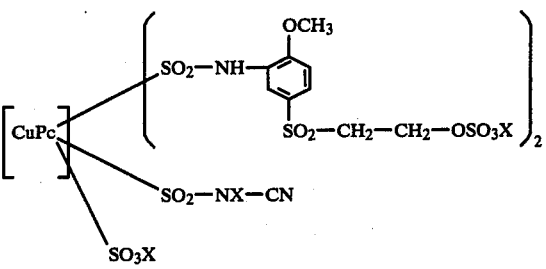

in which CuPc is the copper phthalocyanine radical and X is defined as in claim 1.

4. A compound according to claim 1 of the formula

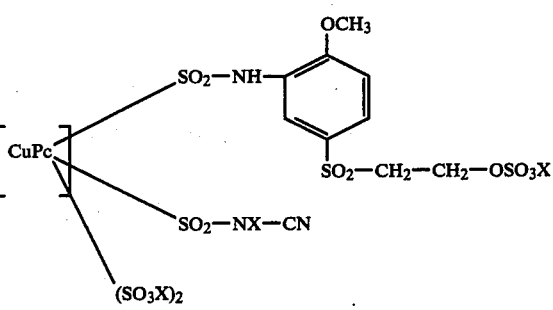

in which CuPc is the copper phthalocyanine radical and X is defined as in claim 1.

5. A compound according to claim 1 of the formula

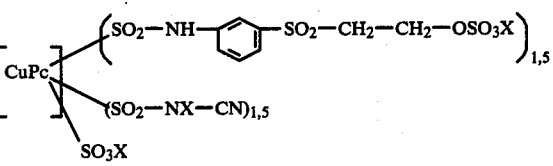

in which CuPc is the copper phthalocyanine radical and X is as defined in claim 1.

6. A compound according to claim 1 of the formula

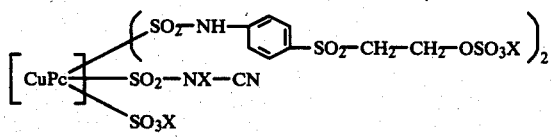

in which CuPc is the copper phthalocyanine radical and X is defined as in claim 1.

7. A compound according to claim 1 of the formula

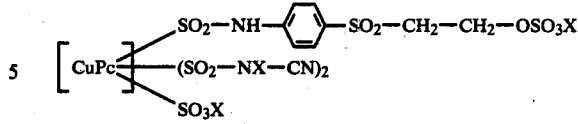

in which CuPc is the copper phthalocyanine radical and X is defined as in claim 1.

8. A compound according to claim 1 of the formula

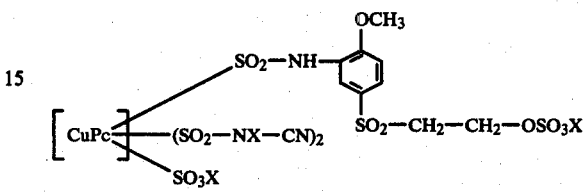

in which CuPc is the copper phthalocyanine radical and X is defined as in claim 1.

* * * * *